(12) United States Patent
Murray

(10) Patent No.: US 9,349,278 B2
(45) Date of Patent: May 24, 2016

(54) DUAL RELEASE CIRCUIT FOR FIRE PROTECTION SYSTEM

(71) Applicant: Fireaway Inc., Minnetonka, MN (US)

(72) Inventor: Donald Murray, Green Bay, WI (US)

(73) Assignee: Fireaway Inc., Minnetonka, MN (US)

( * ) Notice: Subject to any disclaimer, the term of this patent is extended or adjusted under 35 U.S.C. 154(b) by 0 days.

(21) Appl. No.: 14/810,263

(22) Filed: Jul. 27, 2015

(65) Prior Publication Data

US 2015/0332583 A1  Nov. 19, 2015

Related U.S. Application Data

(62) Division of application No. 13/887,749, filed on May 6, 2013, now Pat. No. 9,092,966.

(60) Provisional application No. 61/643,701, filed on May 7, 2012.

(51) Int. Cl.
  *G08B 21/00* (2006.01)
  *F42B 4/00* (2006.01)
  (Continued)

(52) U.S. Cl.
  CPC ............... *G08B 29/02* (2013.01); *A62C 37/10* (2013.01); *A62C 37/48* (2013.01); *A62C 37/50* (2013.01); *G08B 21/18* (2013.01); *A62C 3/10* (2013.01); *B60R 21/0176* (2013.01)

(58) Field of Classification Search
  CPC ........ A62C 37/10; A62C 37/48; A62C 37/36; A62C 37/50; B60R 21/015; B60R 21/0173; F42C 11/008; F42C 11/04; F42C 15/40; F42C 15/24; F42C 7/02; F42C 15/34; F42C 15/36; F42C 11/02; H02M 3/33523
  USPC ......... 340/634, 590, 653; 102/335, 336, 345, 102/217, 265, 275.12, 206, 202.5, 275.6, 102/304; 89/1.812; 180/270
  See application file for complete search history.

(56) References Cited

U.S. PATENT DOCUMENTS

| | | | |
|---|---|---|---|
| 4,101,887 A | 7/1978 | Osborne | |
| 4,199,029 A | 4/1980 | Marek | |

(Continued)

FOREIGN PATENT DOCUMENTS

| WO | WO-2013169637 A1 | 11/2013 |
|---|---|---|
| WO | WO-2013169637 A3 | 11/2013 |

OTHER PUBLICATIONS

U.S. Appl. No. 13/887,749, Examiner Interview Summary mailed Mar. 3, 2015, 1 pg.

(Continued)

*Primary Examiner* — Mirza Alam
(74) *Attorney, Agent, or Firm* — Schwegman Lundberg & Woessner, P.A.

(57) ABSTRACT

A dual release circuit comprises a plurality of pyrotechnic initiators electrically interconnected in series, a plurality of subcircuits electrically interconnected between the pyrotechnic initiators to form at least a first circuit route to electrically interconnect the plurality of pyrotechnic initiators and a second circuit route to electrically interconnect the pyrotechnic initiators, and a control unit electrically connected to the first circuit route and the second circuit route and configured to monitor a first parameter of the first circuit route, monitor a second parameter of the second circuit route, detect when at least one of the first parameter and the second parameter is outside of a specified parameter range, generate an alert indication according to the detection and be able to release the pyrotechnic initiators in response to a release request.

10 Claims, 11 Drawing Sheets

(51) Int. Cl.
*C06C 5/06* (2006.01)
*F42C 11/00* (2006.01)
*F42C 21/00* (2006.01)
*G08B 29/02* (2006.01)
*G08B 21/18* (2006.01)
*A62C 37/10* (2006.01)
*A62C 37/50* (2006.01)
*A62C 37/48* (2006.01)
*B60R 21/017* (2006.01)
*A62C 3/10* (2006.01)

(56) References Cited

U.S. PATENT DOCUMENTS

| | | | | |
|---|---|---|---|---|
| 4,520,348 | A | * | 5/1985 | Swanson ............... A62C 37/36 169/23 |
| 5,796,177 | A | * | 8/1998 | Werbelow ........... B60R 21/0173 180/271 |
| 6,431,071 | B1 | * | 8/2002 | Hodge .................. F42C 15/184 102/221 |
| 9,092,966 | B2 | | 7/2015 | Murray |
| 2010/0271170 | A1 | * | 10/2010 | Meckler .................. B60R 16/03 337/298 |
| 2012/0180680 | A1 | * | 7/2012 | Rastegar ................ F42C 11/02 102/209 |
| 2013/0293382 | A1 | | 11/2013 | Murray |

OTHER PUBLICATIONS

U.S. Appl. No. 13/887,749, Examiner Interview Summary mailed Mar. 31, 2015, 1 pg.
U.S. Appl. No. 13/887,749, Non Final Office Action mailed Sep. 15, 2014, 11 pgs.
U.S. Appl. No. 13/887,749, Notice of Allowance mailed Mar. 3, 2015, 12 pgs.
U.S. Appl. No. 13/887,749, Response filed Aug. 28, 2014 to Restriction Requirement mailed Jul. 1, 2014, 6 pgs.
U.S. Appl. No. 13/887,749, Response filed Dec. 5, 2014 to Non Final Office Action mailed Sep. 15, 2014, 10 pgs.
U.S. Appl. No. 13/887,749, Restriction Requirement mailed Jul. 1, 2014, 6 pgs.
U.S. Appl. No. 13/887,749, Supplemental Notice of Allowability mailed Mar. 31, 2015, 7 pgs.
European Application Serial No. 13724964.5, Office Action mailed Dec. 19, 2014, 2 pgs.
European Application Serial No. 13724964.5, Response filed Jun. 23, 2015 to Office Action mailed Dec. 19, 2014, 12 pgs.
International Application Serial No. PCT/US2013/039669, International Preliminary Report on Patentability mailed Nov. 20, 2014, 7 pgs.
International Application Serial No. PCT/US2013/039669, International Search Report mailed Aug. 5, 2014, 3 pgs.
International Application Serial No. PCT/US2013/039669, Written Opinion mailed Aug. 5, 2014, 5 pgs.
Korean Application Serial No. 10-2014-7034432, Notice of Preliminary Rejection mailed Jul. 17, 2015, 3 pgs.

* cited by examiner

DUAL RELEASE CIRCUIT FOR FIRE PROTECTION SYSTEM

CLAIM OF PRIORITY

This application is a divisional of U.S. patent application Ser. No. 13/887,749 (now U.S. Pat. No. 9,092,966) filed on May 6, 2013, which claims the benefit of priority under 35 U.S.C. §119(e) of U.S. Provisional Patent Application Ser. No. 61/643,701, titled "DUAL RELEASE CIRCUIT," filed on May 7, 2012, both of which are incorporated herein by reference in their entirety.

TECHNICAL FIELD

This document relates to a dual release circuit and, more specifically, to a dual release actuation circuit in a fire protection circuit.

BACKGROUND

In 2006, the International Maritime Organization (IMO) updated various fire protection requirements for ships including a clarification of the requirements for monitoring and actuating the extinguishing systems if the extinguishing systems are placed inside the compartment (e.g., an engine room) that is being protected from fire.

Traditionally, these systems have been released either through mechanical pull-cables or by pneumatic means. The use of electric release was not prohibited, although no electrical equivalent to the pneumatic methods was available. The concept of a suitable electrical method that would satisfy the technical requirements of the IMO and other maritime authorities may be desirable because the installation of electrical cable on ships is expected to be less costly than mechanical or pneumatic methods.

As an example of one regulatory authority, the United States Coast Guard (USCG) originally required all firefighting systems placed outside a space to be protected in order to insure access to the release methods and to insure the system is not damaged by being in the space. Eventually, the USCG allowed some systems to be placed in the space using dual circuit pneumatic release methods but, on further evaluation, it was found that the equipment experienced significant failure. In consequence, the practice of placing fire protection equipment inside the protected space is typically considered unreliable and thus the practice of allowing the fire equipment to be placed in the fire area was discontinued. Allowing the marine authorities to return to fire equipment placed inside the protected space would require overcoming their concerns for the robustness of the equipment and the actuation methods.

For the foregoing reasons, there is a need for an electrical release for a fire protection system. The dual circuit release described herein will allow more robust equipment that will survive fire and damage. This method provides not only duplicated release but also provides supervision to annunciate or otherwise indicate a potential loss of capability before the loss of capability happens. The proposed dual circuit release will provide the opportunity to detect and correct faults to ensure the on-going robustness of the system.

OVERVIEW

Embodiments relate to a dual release circuit, actuation circuit and method of operating a dual release circuit and actuation circuit. More particularly, the invention relates to a dual release circuit actuation in a fire protection circuit. Some embodiments relate to at least two circuits that are monitored for faults so that a single fault will not prevent circuit actuation. Embodiments can include a series circuit approach results in the lowest possible current.

Embodiments can provide increased reliability over present methods, and lower the cost of the actuation method, the equipment being actuated, and the cost of installation. This allows the adoption of new fire extinguishing technology (aerosols) where the containers may be placed within a protected space and placed on ceilings and walls to minimize space requirements.

Embodiments of the proposed dual release circuit allow for more robust equipment that will survive fire and damage. This method provides for not only duplicated release but also provides supervision to indicate a potential loss of capability before the actual loss of capability occurs. The proposed dual circuit release will provide the opportunity to correct faults and thus insure the on-going robustness of the system.

Embodiments of a fire protection actuation system focus on reliability and the ability to survive damage. The circuits can be duplicated and monitored. The monitoring includes supervision through the initiators. The monitoring can indicate a fault that can be corrected. In the event of a deteriorated state (any first fault such as a short or open circuit), the system will retain its full ability to function and active the initiators.

Embodiments relate to a dual release circuit, actuation circuit and method of operating a dual release circuit and actuation circuit. An example of the dual release circuit includes a plurality of pyrotechnic initiators electrically interconnected in series, a plurality of subcircuits electrically interconnected between the pyrotechnic initiators to form at least a first circuit route to electrically interconnect the plurality of pyrotechnic initiators and a second circuit route to electrically interconnect the pyrotechnic initiators, and a control unit electrically connected to the first circuit route and the second circuit route. The control unit is configured to monitor a first parameter of the first circuit route, monitor a second parameter of the second circuit route, detect when at least one of the first parameter and the second parameter is outside of a specified parameter range, and generate an alert indication according to the detection.

An example of a fire protection actuation circuit includes a plurality of pyrotechnic initiators electrically interconnected in series, a plurality of subcircuits electrically interconnected between the pyrotechnic initiators to form a first circuit route to electrically interconnect the plurality of pyrotechnic initiators and a second circuit route to electrically interconnect the pyrotechnic initiators, and a control unit electrically connected to the first circuit route and the second circuit route. A pyrotechnic initiator can be included in an ignition unit of a fire extinguishing assembly. The control unit can be configured to monitor a first parameter of the first circuit route, monitor a second parameter of the second circuit route, detect when at least one of the first parameter and the second parameter is outside of a specified parameter range, generate an alert indication according to the detection, and apply, in response to a release request, a release current to the pyrotechnic initiators using at least one of the first circuit route or the second circuit route.

An example of a method of operating a dual release circuit includes monitoring, in a supervisory mode, a first circuit route and a second circuit route. The first circuit route and the second circuit route include a plurality of sub-circuits electrically interconnected to a plurality of pyrotechnic initiators. The monitoring can include monitoring a first parameter of the first circuit route and a second parameter of the second circuit route, detecting that at least one of the first parameter or the second parameter is outside of a specified parameter range, and generating an alert indication in response to the detecting.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, the various examples discussed in the present document.

DETAILED DESCRIPTION

Figure 1:
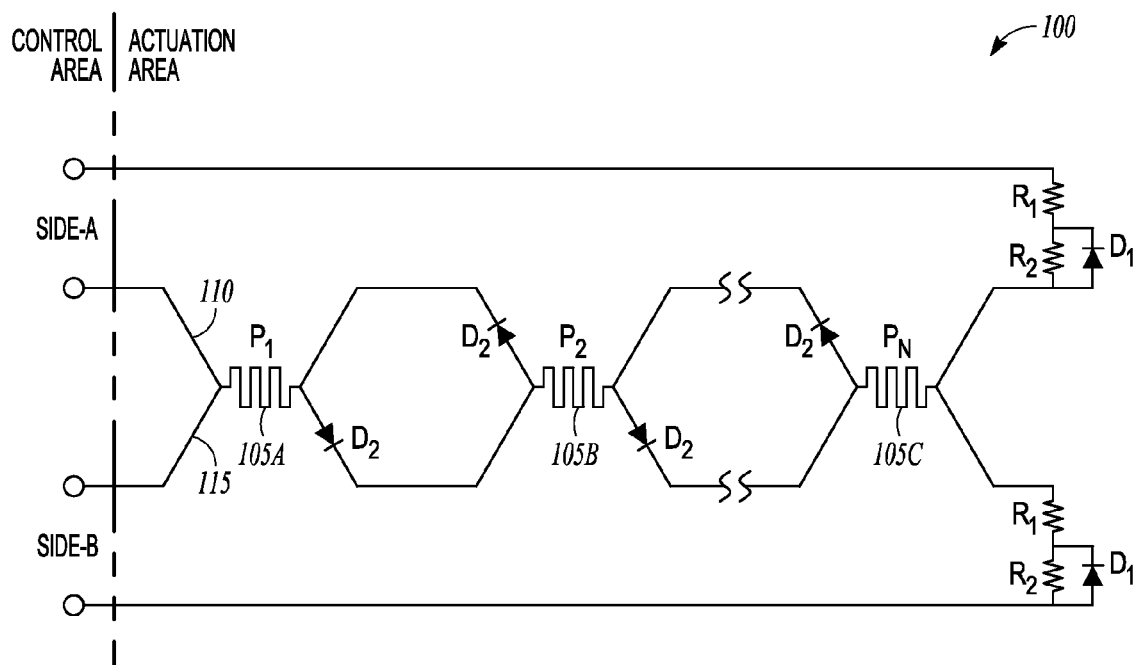
FIG. 1 illustrates portions of an example of a dual release circuit.

Embodiments relate to a circuit based activation of safety equipment. Embodiments related to electrically release (activation) a series of pyrotechnic initiators. These initiators, in-turn, will perform activities such as the release of fire extinguishing systems, performing operations such as stopping/starting equipment, opening/closing doors, etc. The Dual-Release Circuit illustrated in FIG. 1 provides a release method that monitors the circuit for reliability so that a fault, such as an open circuit caused by a broken wire, can be annunciated or otherwise indicated. The release is to also survive any single fault so that it will provide the release of all the pyrotechnic initiators even if there has been a fault.

Pyrotechnic initiators can be used to actuate fireworks, explosives for military/demolition/mining application, safety devices for military (aircraft canopy ejection, etc.). These devices may need a certain level of energy input that can be an electrical current applied over a given time with a typical "guaranteed release energy" for a device being 1 amp over 100 milliseconds. Additionally, a very low trickle current (e.g., 3 to 25 milliamps) can be applied to the pyrotechnic initiators for monitoring to confirm the device is in place and therefore available for actuation. The circuits may be in series or in parallel with the series approach being the most common route because, not only is it the more simple arrangement, but also the current needed is lower than the parallel methods. When actuated, the initiators can be used to trigger other devices, such as a fire extinguishing unit. Actuation of the initiators may create either an open or a short at that point, but the useful feature is that all the devices will have received sufficient energy to actuate simultaneously in advance of their failure to an open or short being significant.

For a simple series circuit with no backup, the technician or the equipment to release the circuit performs a simple circuit check to confirm continuity, and any faults are detected and corrected manually in advance of the release of the initiators. A better approach is to implement an activation circuit with multiple initiators that are "survivable" (e.g., tolerant to damage or failure). Fire alarm systems may use supervised circuits for both the detection of fire and for the signals to release the extinguishing systems. The release circuits are typically operating solenoids because pyrotechnic initiators or "squib" devices have explosive classification. These solenoid-based release circuits are frequently supervised so that a fault (an "open") is annunciated but the fault must be repaired for the extinguishing system to function and release fire retardant material. These types of circuits that are not fault tolerant are commonly referred to as Class B circuits. More advanced circuits are Class A circuits that monitor for faults (which may both opens and shorts) and, while annunciating the fault, the circuit will still retain full functionality. Typically, solenoid-based class A circuit use a parallel circuit topology; leading to higher cost. The supervision is typically for circuit wires and not for the actuating devices (e.g., the solenoids) themselves. The embodiments described herein use multiple pyrotechnic initiators instead of solenoids to implement a Class A fire alarm circuit and arrange the pyrotechnic initiators in series.

Typical fire alarm release circuits can be similar to circuits used to sound a fire alarm bell. Typically, these are parallel circuits that generally do not provide supervision through the bell or release solenoid. Supervision of series circuits is accomplished by supplying a trickle current through the wire with the current limited by an end-of-line resistor. The alarm unit monitors the circuit to insure that the small current confirms the circuit is intact. In a typical fire alarm system, this supervision current does not go through the alarm devices or release devices.

FIG. 1 illustrates portions of an example of a dual release circuit 100. The dual release circuit 100 includes a plurality of pyrotechnic initiators 105A, 105B, 105C. The pyrotechnic initiators are arranged in series and the example has a quantity of initiators numbered 1 to N, where N is positive integer greater than 1. In the example shown, a first circuit route 110 (side A) and a second circuit route 115 (side B) electrically interconnects the pyrotechnic initiators to create a circuit with redundancy. Each pyrotechnic initiator can be electrically activated by two circuit routes so that physical damage to one circuit route, which would typically result in a broken wire or a short, will not prevent the release of all the initiators. Additional circuit routes may be included to increase circuit redundancy.

Both release circuit routes can be supervised with trickle currents so that an open or short circuit can be detected. The dual release circuit 100 may have four states: Supervision Side-A/First Side, Supervision Side-B/Second Side, Release Side-A/First Side, and Release Side-B/Second Side. A control unit (shown in FIG. 4) can be electrically connected to the first circuit route and a second circuit route to control the state of the dual release circuit 100. In Supervision Mode, the control unit monitors a first parameter of the first circuit route 110 and a second parameter of the second circuit route 115. When the control unit detects that at least one of the first parameter and the second parameter is outside a specified (e.g., programmed) range, the control unit may generate an alert indication (e.g., an alerting signal provided to a process, or an audio or visual indication provided to a user).

Figure 2A:
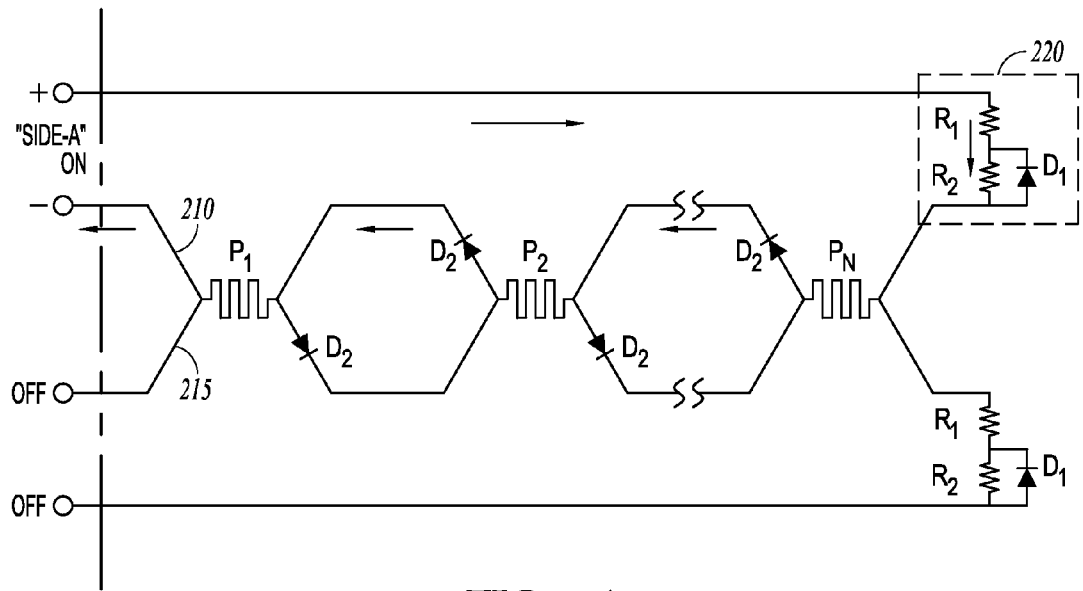
FIGS. 2A and 2B illustrate an example of supervision mode of a dual release circuit.

FIG. 2A illustrates an example of Supervision Side-A/First Side. The first circuit route 210 and the second circuit route 215 may include an end of line circuit 220. The end of line circuit shown includes a resistive divider circuit and a diode. In this supervision mode, the control unit may apply a constant voltage to the first circuit route 210, and monitor the current flowing through the first circuit route 210 from Side-A as the first parameter. In some examples, the control unit monitors a trickle direct current (DC) from Side-A while Side B is off. The value of the constant voltage applied and the resistance of the resistive divider circuit determines the trickle current used for supervision. If the monitored current is in the expected normal range, the circuit is considered as "normal" and the circuit is turned off and then Side-B may be turned on. If the monitored current is not within the expected range, the control unit may generate an alert indication to annunciate the condition and may then proceed to the supervision of Side-B/Second Side.

Figure 2B:
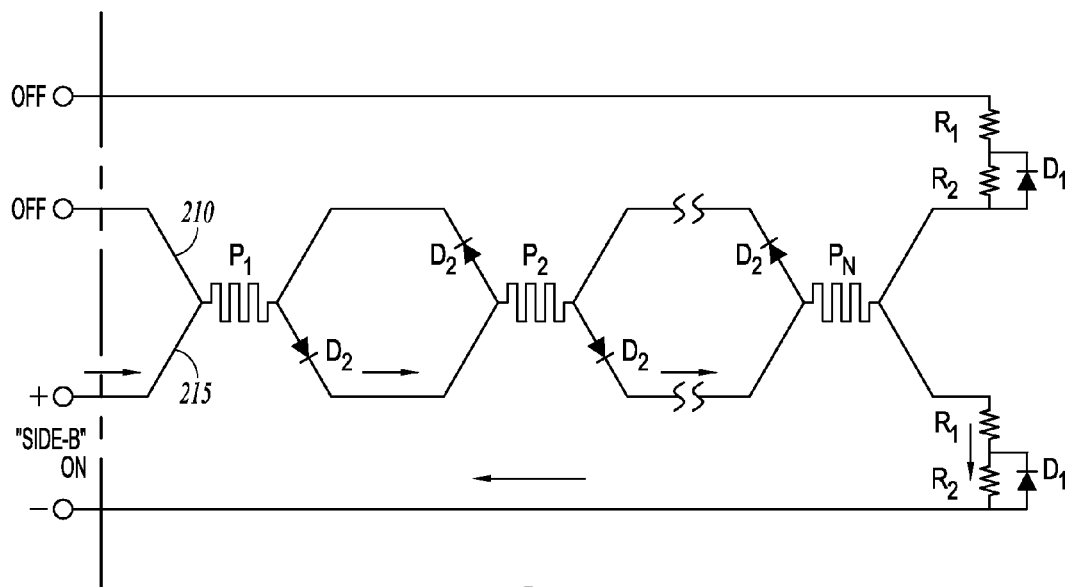

FIG. 2B illustrates an example of Supervision Side-B/Second Side. In this supervision mode, the control unit may apply a constant voltage to the second circuit route 215, and monitor the current flowing through the second circuit route 215 from Side-B as the second parameter. If the monitored current is in the expected range, the circuit is considered "normal" and the circuit is turned off and Side-A may again be turned on and the supervision can be repeated in a cycle. If the monitored current for Side-B is not within the expected range, the control unit may generate an alert indication to annunciate the condition and may then proceed to the supervision of Side-A/First Side. The repetitive cycle for monitoring of the dual release circuit may be repeated recurrently (e.g., continuously or according to a schedule). In supervision mode, the control unit may cycle between Side-A and Side-B with one side being on while the other side is off.

Figure 3A:
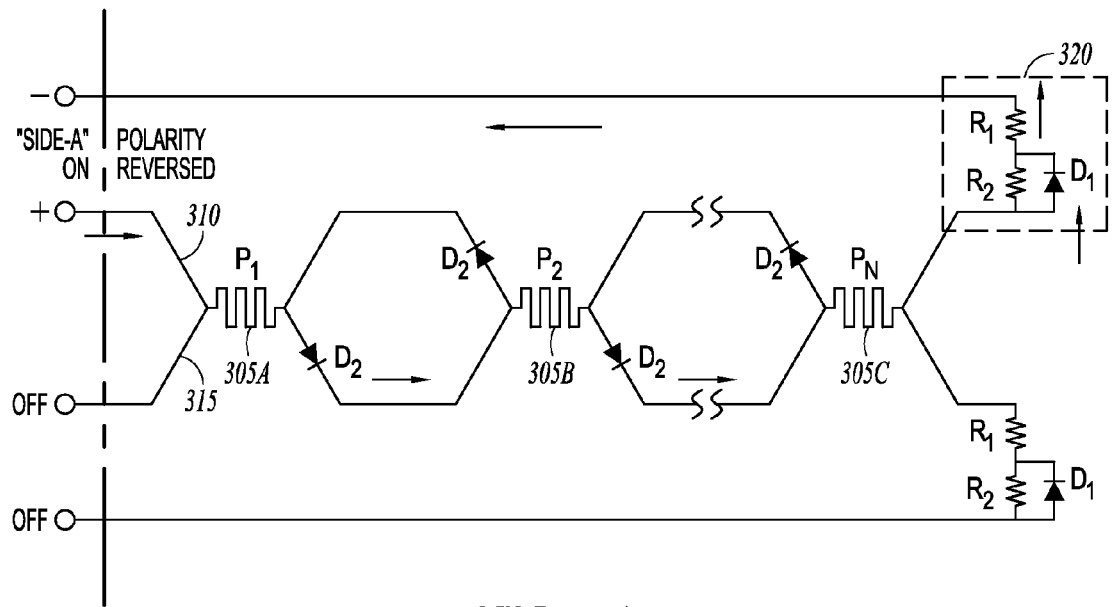
FIGS. 3A and 3B illustrate portions of an example of a release mode of the dual release circuit.

FIG. 3A illustrates an example of Release Side-A/First Side. When the release of the pyrotechnic initiators 305A, 305B, and 305C is required, the control unit may enter a release mode. In the example of FIG. 3A, the control unit may apply a constant voltage with a polarity different from the supervision mode. This reversed polarity results in a current reversed from the monitoring current to flow through the first circuit route 310. The release current flowing in the first circuit route 310 passes through the diode of the end of line circuit 320. Because activation of the diode reduces the resistance in the first circuit route, the release current is higher than the monitoring current used in supervision mode. The level or magnitude of the release current and the duration of the release current will provide the energy to ignite the series of pyrotechnic initiators.

Figure 3B:
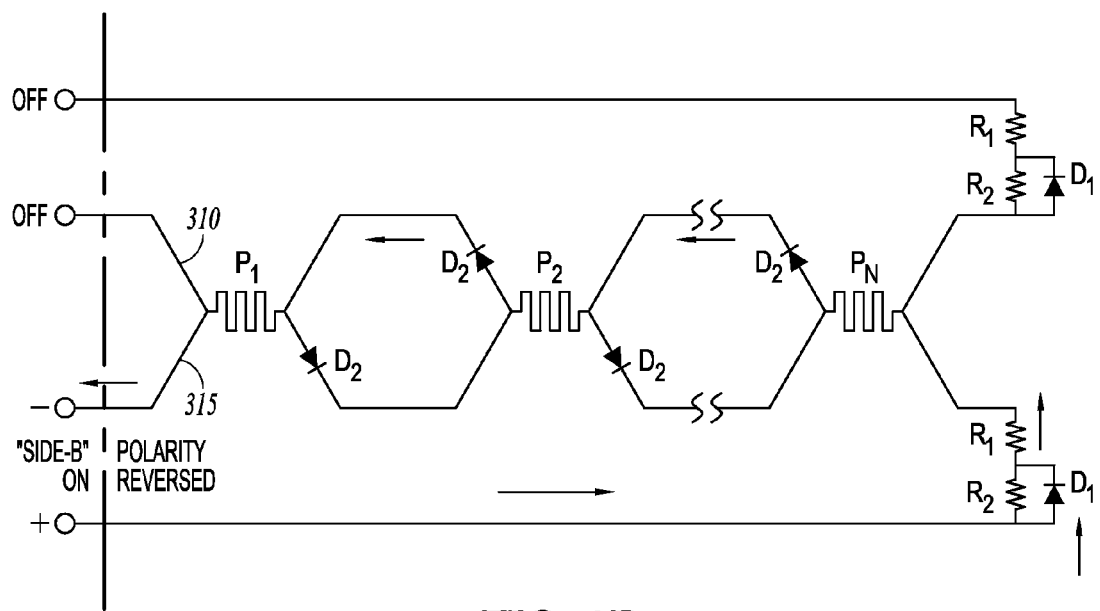

FIG. 3B illustrates an example of Release Side-B/Second Side. In the release mode, the control unit may cycle between Release Side-A/First Side and Release Side-B/Second Side. In Release Side-B/Second Side, Side-A may be turned off after a specified duration and Side-B may be turned on with polarity of the applied voltage also reversed and the process of providing energy to the pyrotechnic initiators is repeated. The repetitive releasing cycle may be continued for a sufficient number of cycles (e.g., between Side-A and Side-B) to provide reasonable assurance that the system has released. The control unit can provide monitoring to detect any circuit failure (e.g., a circuit open or a short) so that an alert indication can be generated. The cycling during release mode may overcome any single first fault in order to provide adequate energy to activate all of the pyrotechnic initiators in the dual release circuit. Additional circuit routes can be added (e.g., a triple release circuit, etc.) to increase the robustness of the release circuit.

Figure 4:
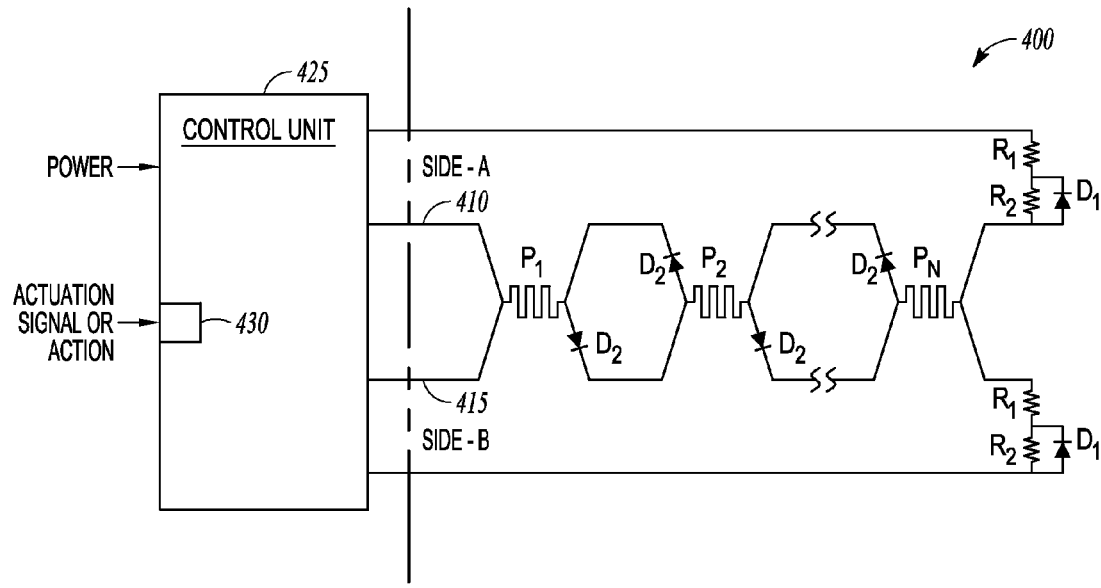
FIG. 4 shows a diagram of an example of a dual release circuit with a control unit.

FIG. 4 shows a diagram of an example of a dual release circuit 400 with a control unit 425. The control unit 425 can provide electrical power, cycle timing and monitoring of faults for supervision mode, and the cycle timing and polarity reversal for release mode. To conserve energy, the control unit 425 may pulse the release current (e.g., a circuit pulse of 1 amp for $\frac{1}{16}^{th}$ of a second). The control unit 425 may include a port 430 to receive a release request. The control unit 425 initiates application of the release current to at least one of the first circuit route 410 or the second circuit route 415 in response to receiving the release request. In some examples, the dual release circuit 400 is included in a fire protection system that is user activated and the release request can be received from a user activation interface. In some examples, the dual release circuit 400 is included in a fire protection system for marine use.

Figure 5:
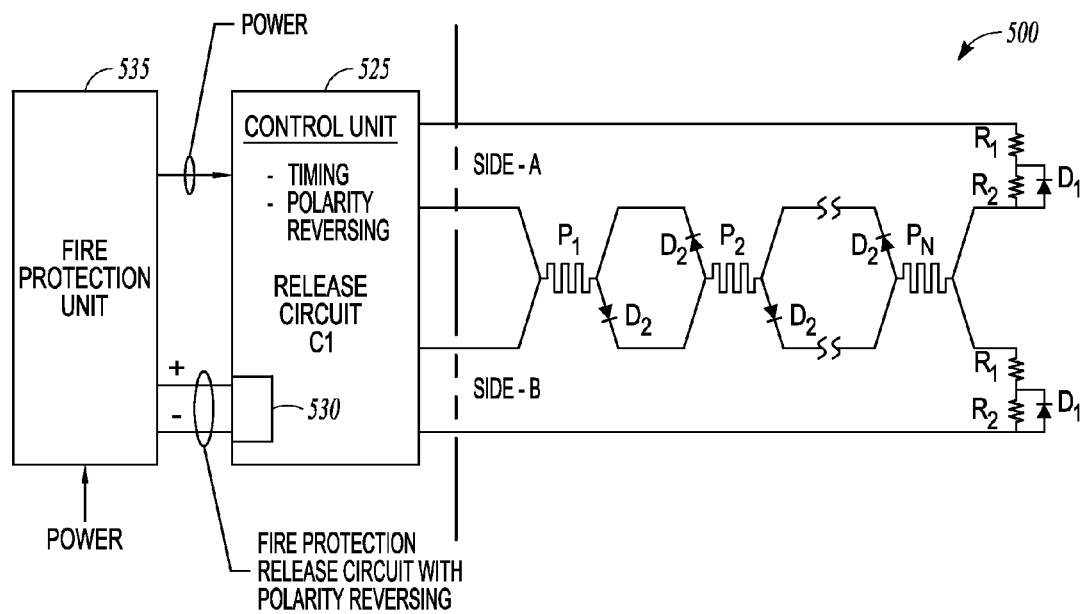
FIG. 5 shows a diagram of portions of another example of a fire protection system.

FIG. 5 shows a diagram of portions of another example of a fire protection system. The system includes a dual release circuit 500, a control unit 525 and a fire detection unit 535. The fire detection unit 535 may include one or more sensors to detect a fire. The control unit 525 includes a port 530 to receive the release request from the fire detection unit 535 in response to the fire detection unit 535 detecting an indication of a fire. The dual release circuit 500 may include electrical devices to condition the dual release circuit against unwanted electrical spikes that could result in false release of any or all of the pyrotechnic initiators. The control unit 525 and fire detection unit 535 may be part of a larger system that is capable of providing multiple release circuits to increase the size of the number of similar initiator actuation circuits in the system (e.g., C1, C2, . . . CN), and may include additional power supplies, fire detection units, control units, and include annunciation and display capabilities.

Figure 6:
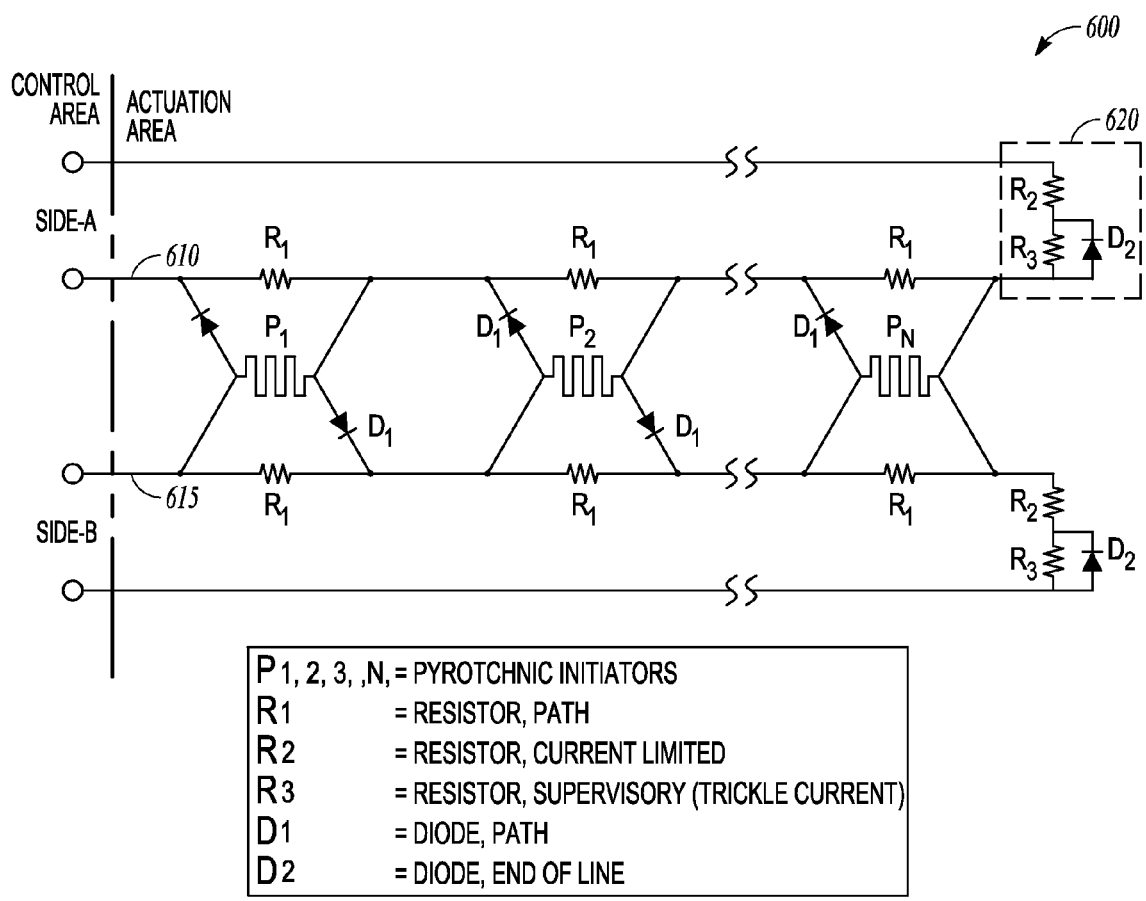
FIG. 6 illustrates portions of another example of a dual release circuit.

FIG. 6 illustrates portions of another example of a dual release circuit 600. The dual release circuit 600 again includes a plurality of subcircuits electrically interconnected between the pyrotechnic initiators to form a first circuit route 610 and a second circuit route 615. In this example, the subcircuits include resistors as well as diodes. In some examples, the resistors ($R_1$) arranged in parallel with the pyrotechnic initiators may instead be diodes. In a supervision mode, a control unit (not shown) applies a first constant monitoring voltage to the first circuit route, apply a second constant monitoring voltage to the second circuit route, and monitor a first current flowing through the first circuit route as the first parameter and monitor a second current flowing through the second circuit route as the second parameter. The first circuit route 610 and the second circuit route 615 include an end of line circuit 620. In a release mode, the control unit may reverse the polarity of the voltage at terminals of one or both the circuit routes. This causes the diode in the end of line circuit to become active and changes the current flowing through the circuit routes to activate the pyrotechnic initiators.

Figure 7:
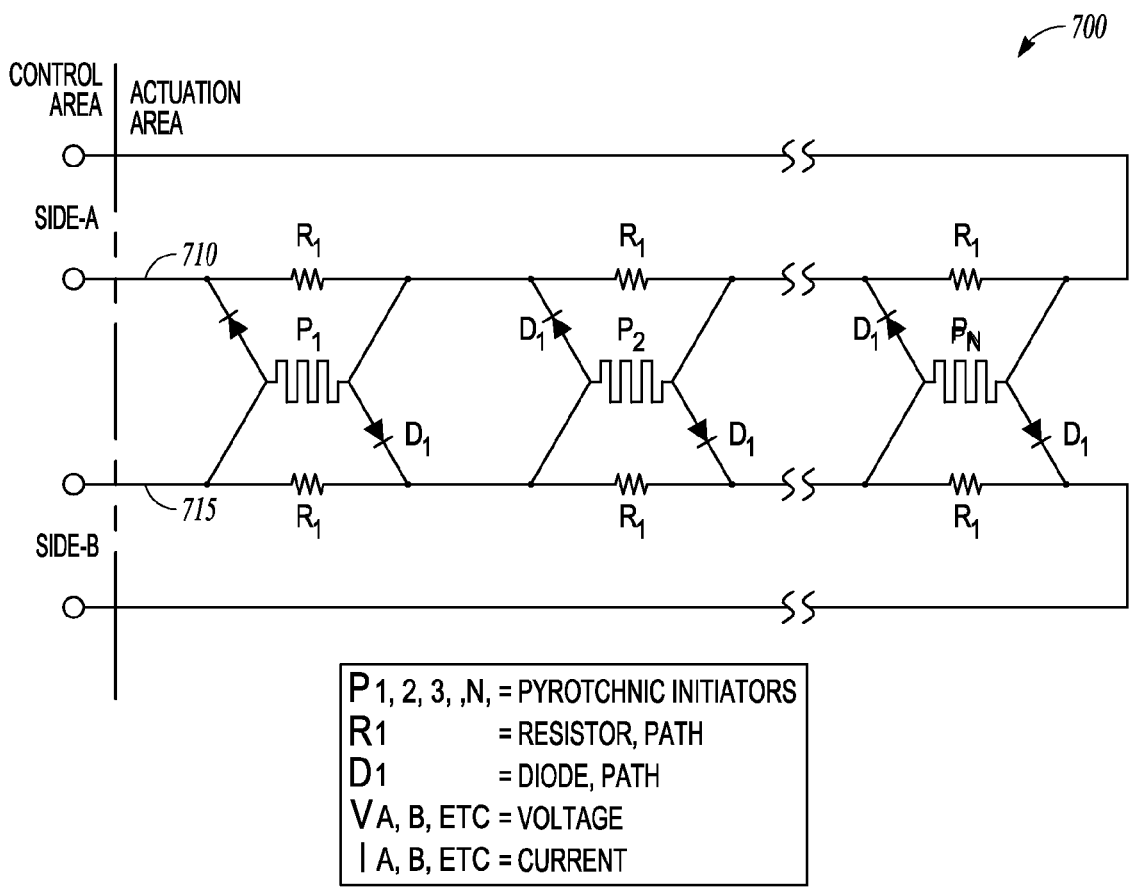
FIG. 7 illustrates portions of still another example of a dual release circuit.

FIG. 7 illustrates portions of still another example of a dual release circuit 700. The dual release circuit 700 again includes a plurality of subcircuits electrically interconnected between the pyrotechnic initiators to form a first circuit route 710 and a second circuit route 715. However, note that the example shown does not include an end of line circuit. In supervision mode, the control unit applies a first constant monitoring current (instead of voltage) to the first circuit route 710 and applies a second constant monitoring current to the second circuit route 715. In response to applying the constant monitoring currents, the control unit monitors a first voltage at terminals of the first circuit route 710 as the first parameter and monitors a second voltage at terminals of the second circuit route 715 as the second parameter.

Figure 8A:
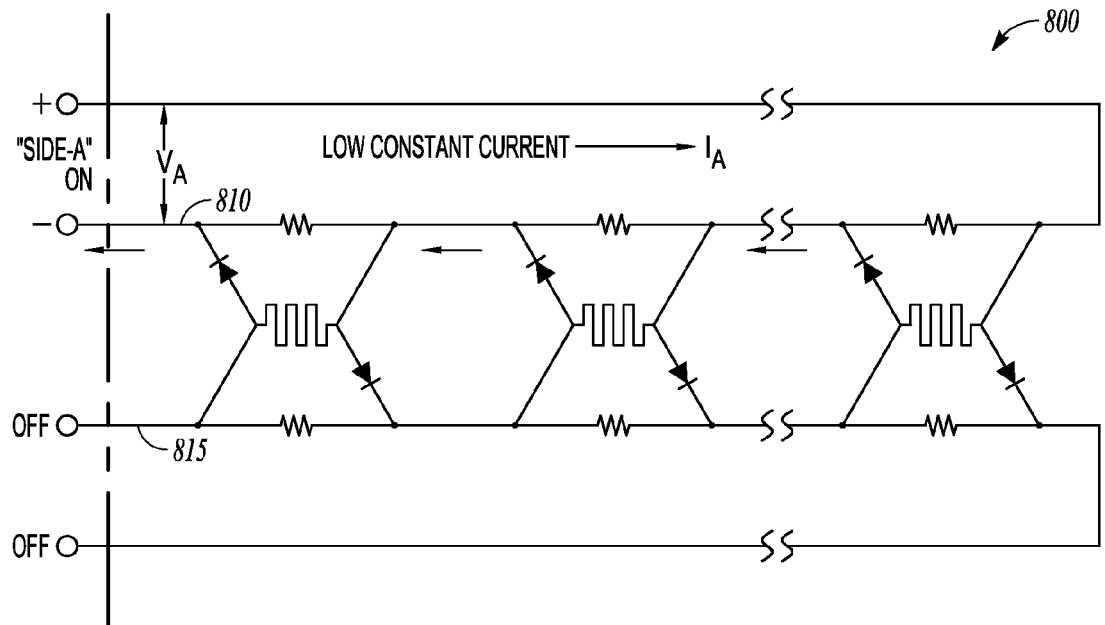
FIGS. 8A and 8B illustrate an example of a dual release circuit operating in a supervision mode.
Figure 8B:
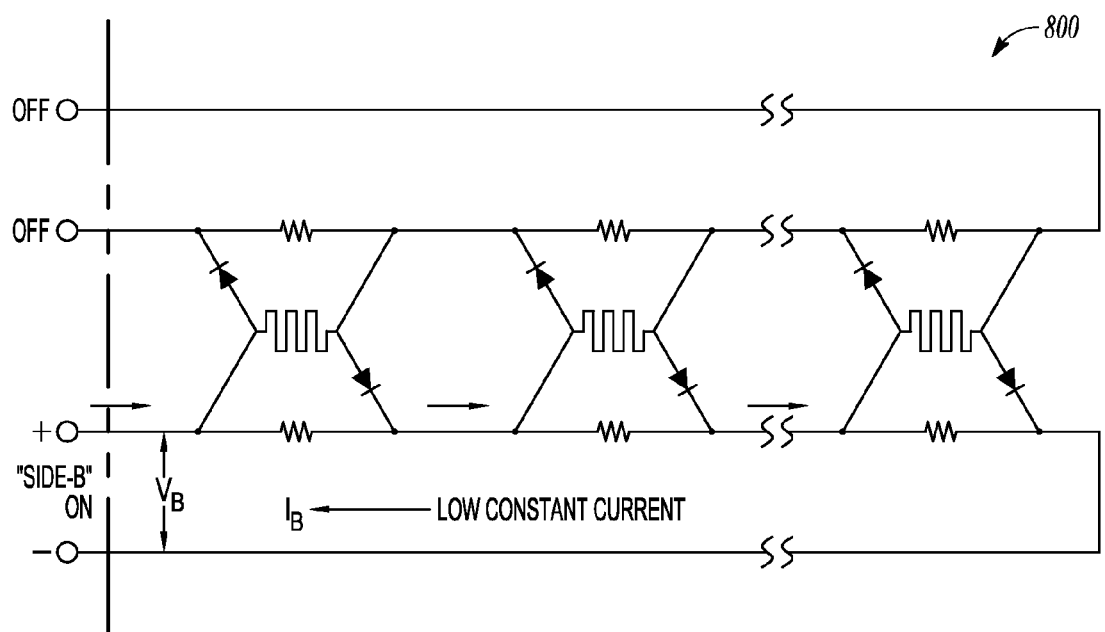

FIGS. 8A and 8B illustrate an example of a dual release circuit 800 operating in a supervision mode. FIG. 8A illustrates an example of Supervision Side-A/First Side. The control unit applies a constant current of low magnitude to the first circuit route 810 and monitors the resulting voltage at the Side-A terminals. The constant current is applied with one or both of a magnitude and duration to ensure that the pyrotechnic initiators are not released. If the monitored voltage for Side-A is not the expected value or within the expected range, the control unit may generate an alert condition. The control unit may then proceed to the supervision of Side-B/Second Side. FIG. 8B illustrates an example of Supervision Side-B/Second Side. The control unit applies a constant current of low magnitude to the second circuit route 815 and monitors the resulting voltage at the Side-B terminals. As shown in the example in the Figure, the monitoring current may be applied to the second circuit route 815 in a different direction from the first circuit route 810 (e.g., the monitoring current may be applied to different ends of the series of subcircuits). If the monitored voltage for Side-B is not the expected value, or is not within the expected range, the control unit may generate an alert condition. The control unit may then proceed to the supervision of Side-A/First Side. The control unit may continuously cycle between supervision of the first circuit route 810 and the second circuit route 815, or may alternately initiate the monitoring of the first and second circuit routes according to a schedule.

Figure 9A:
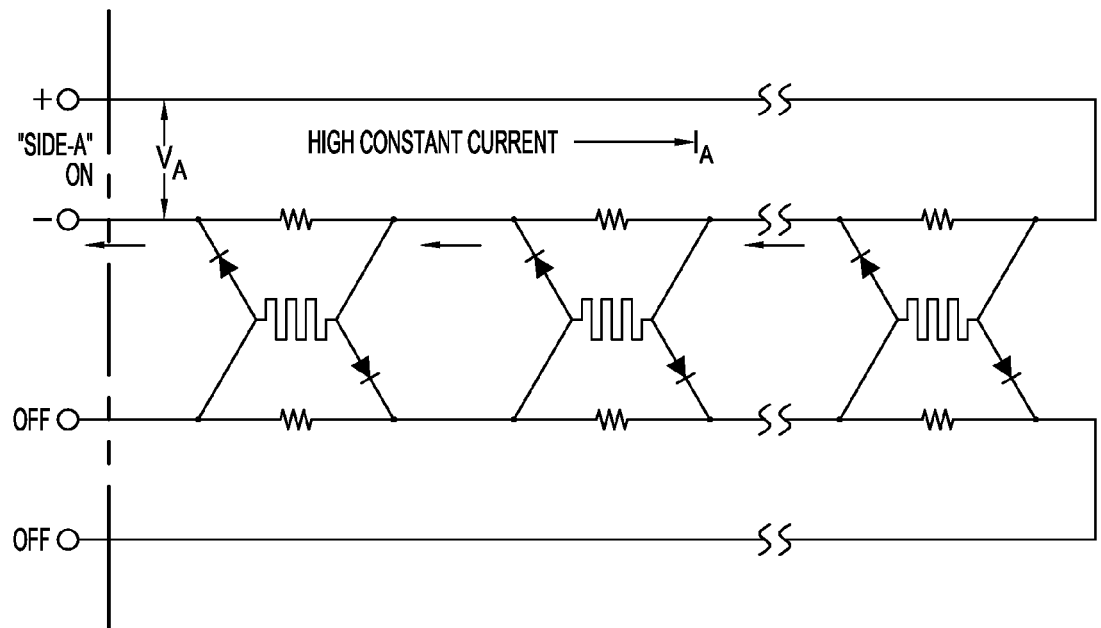
FIGS. 9A and 9B illustrate an example of a dual release circuit operating in a release mode.
Figure 9B:
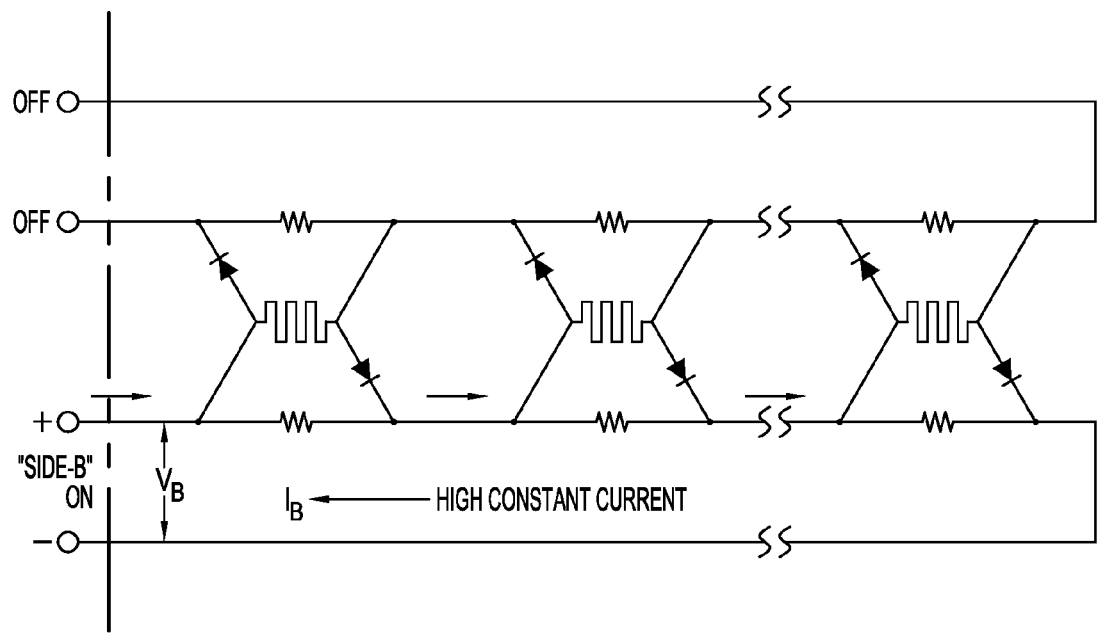

FIGS. 9A and 9B illustrate an example of a dual release circuit operating in a release mode. FIG. 9A illustrates an example of Release Side-A/First Side. The control unit enters release mode when the release of the pyrotechnic initiators is required. In the release mode, the control unit may apply a release current to at least one of the first circuit route 910 and the second circuit route 915. The release current has a higher or greater magnitude than the magnitude of monitoring current used in the supervision mode. The magnitude of the release current and the duration of the release current will provide the energy to ignite the series of pyrotechnic initiators. In the example shown, the release current is applied in the same direction as the monitoring current during supervision mode, but the control unit may apply the release current in a different direction from the monitoring current of supervision mode. FIG. 9B illustrates an example of Release Side-B/Second Side. The control unit may cycle between Release Side-A/First Side and Release Side-B/Second Side in the release mode. During Release Side-B/Second Side, Side-A may be turned off after a specified duration and Side-B may be turned on. The cycling may be continued in release mode for a sufficient number of cycles (e.g., between Side-A and Side-B) to provide reasonable assurance that the system has released.

Figure 10A:
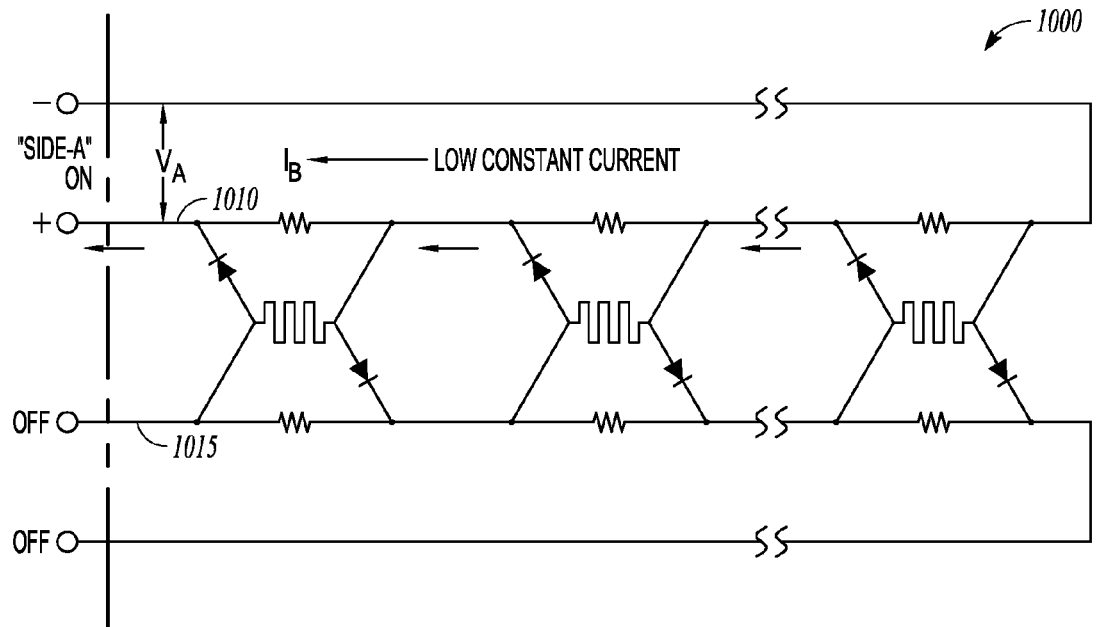
FIGS. 10A and 10B illustrate an example of a dual release circuit operating in a line check mode.
Figure 10B:
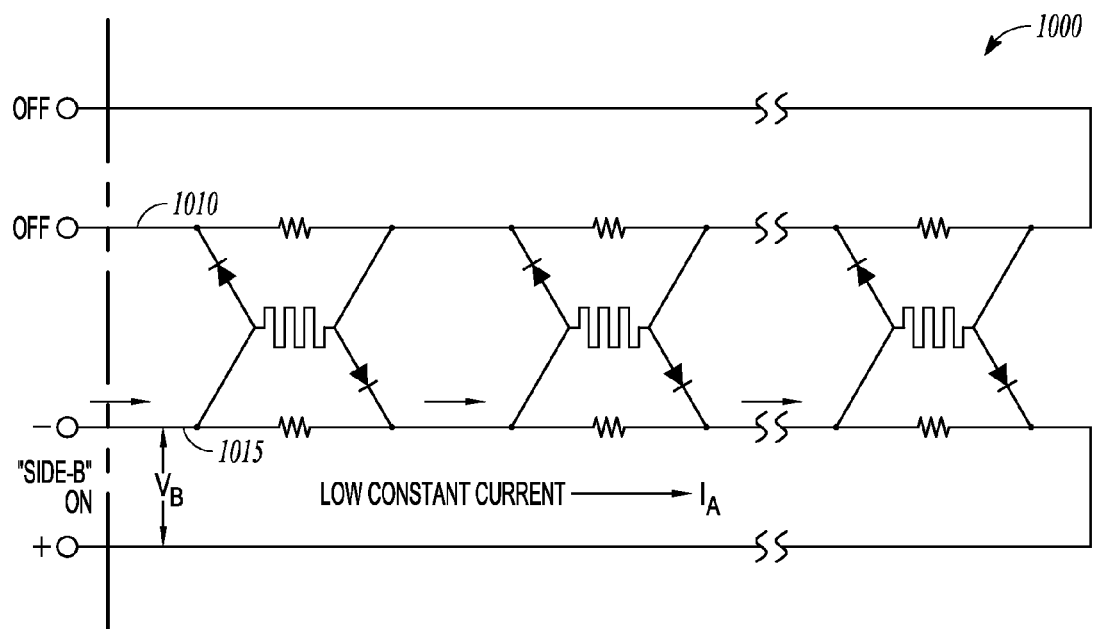

FIGS. 10A and 10B illustrate an example of a dual release circuit 1000 operating in a line check mode. The line check mode is similar to supervision mode and is executed to confirm that one or more of the first circuit route 1010 and the second circuit route 1015 are operable. In the line check mode, a line check is recurrently applied to the first circuit route 1010 and the second circuit route 1015. The line check current is applied in a direction opposite of the release current, and the magnitude of the line check current is insufficient to ignite the plurality of pyrotechnic initiators. The line check current can be pulsed to conserve energy.

Figure 11:
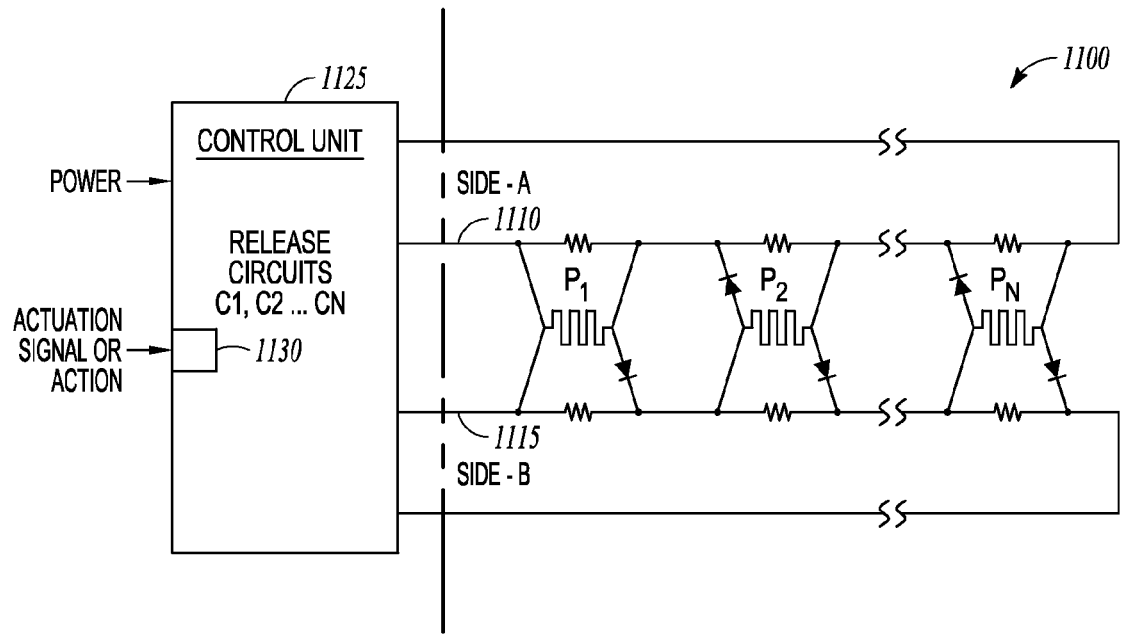
FIG. 11 shows a diagram of an example of a constant current dual release circuit with a control unit.

FIG. 11 shows a diagram of an example of a constant current dual release circuit 1100 with a control unit 1125. The control unit 1125 can provide electrical power, cycle timing and monitoring of faults for supervision mode, release mode, and line check mode. The control unit 1125 may include a port 1130 to receive a release request, such as from a user activation unit or a fire detection unit.

Figure 12:
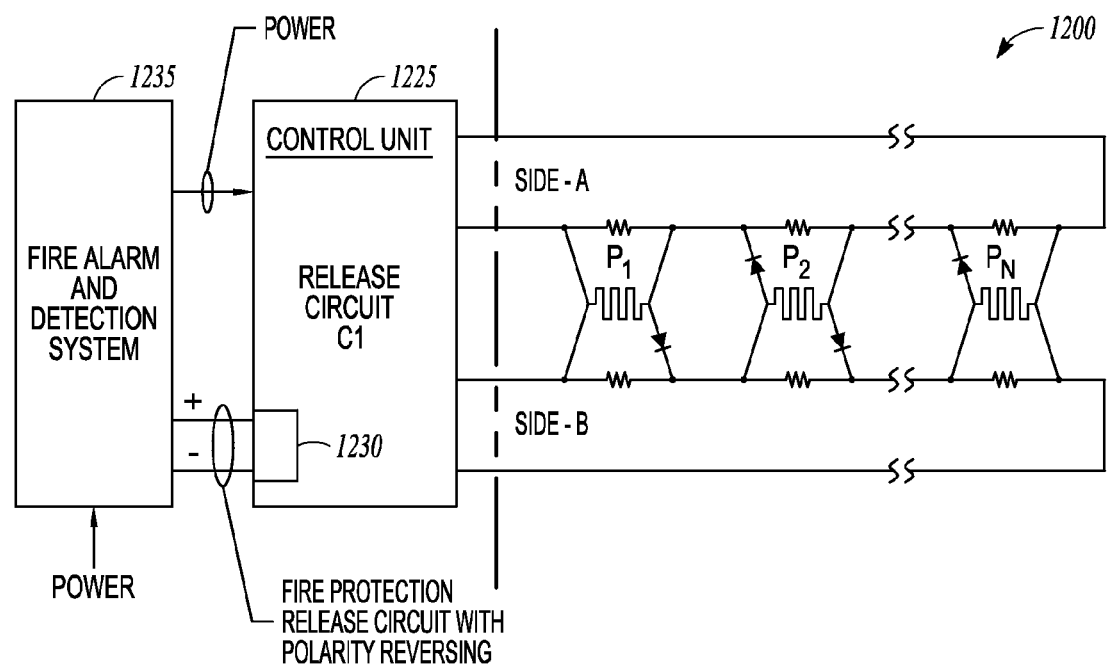
FIG. 12 shows a diagram of portions of another example of a fire protection system.

FIG. 12 shows a diagram of portions of another example of a fire protection system. The system includes a constant current dual release circuit 1200, a control unit 1225 and a fire detection unit 1235. The fire detection unit 1235 may include one or more sensors to detect a fire. The control unit 1225 includes a port 1230 to receive the release request from the fire detection unit 1235 in response to the fire detection unit 1235 detecting an indication of a fire. The system may include multiple release circuits to increase the size of the number of similar initiator actuation circuits in the system (e.g., C1, C2, CN), and may include additional power supplies, fire detection units, control units, and include audio and display capabilities to provide alerts or an indication of the location of a detected fault.

Figure 13:
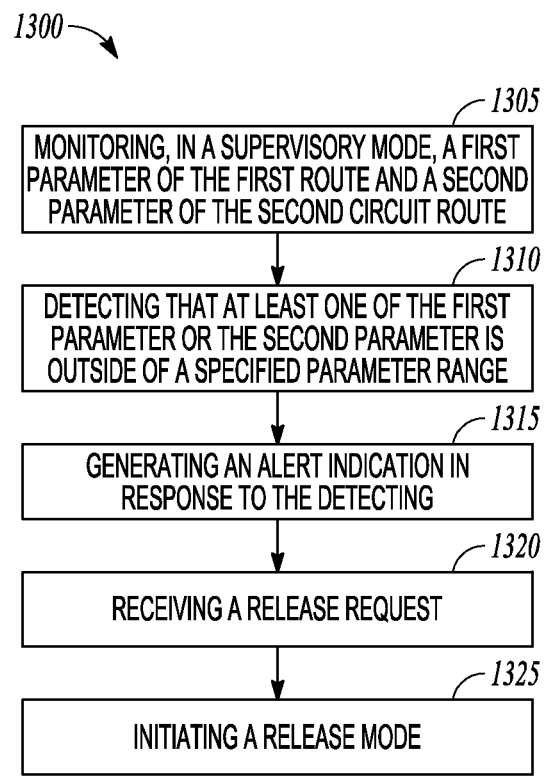
FIG. 13 shows a flow diagram of a method 1300 of operating a dual release circuit.

FIG. 13 shows a flow diagram of a method 1300 of operating a dual release circuit. At block 1305, a first circuit route and a second circuit route are monitored in a supervisory or supervision mode. The first circuit route and the second circuit route include a plurality of sub-circuits electrically interconnected to a plurality of pyrotechnic initiators. The monitoring may include monitoring a first parameter of the first circuit route (e.g., one or more of voltage, current, or resistance) and a second parameter of the second circuit route. At block 1310, at least one of the first parameter or the second parameter is detected to being not equal to a specified parameter value, or is outside of a specified parameter value range. At block 1315, an alert indication is generated in response to the detection. In some examples, the method 1300 includes at block 1320 receiving a release request at the dual release circuit. The release request can be in the form of an electrical signal received from a user activation interface or a fire detection unit. At block 1325, a release mode is initiated in the dual release circuit in response to receiving the release request.

The proposed methods and electric arrangements described provide supervision, not only of the electrical wires to the fire protection containers, but also provide supervision through the pyrotechnic initiators to confirm that it is operable and thus available. The fire protection system may identify a problem (e.g., a break in a wire) and still retain full release capability. With the fire extinguishing system containers being placed in the compartment that can suffer fire and damage, robustness is a major issue. A robust and reliable actuation method for fire protection is desirable. The USCG and other marine authorities may be more willing to accept new extinguishing technologies and installation methods provided that the systems include monitoring of actuation, are tolerant to damage, and are generally considered reliable for the application. The electric dual release circuit approach is an improvement over the traditional pneumatic methods.

The embodiments described herein may reduce the need to pipe the extinguishing agent to the compartment of concern from a separate compartment and thus save significantly on installation costs. With the methods of electric actuation described, both the equipment that can be installed in the space and the cost of installation of the equipment will be greatly reduced in cost. This is because it is much easier and faster to install electric cable than to install pipe and pneumatic systems. Because there is no need for a large separate compartment outside to store the extinguishing equipment, less space may be required if fire extinguishing systems can be installed as a distributed system inside a protected machinery space with the containers placed on the walls and ceilings of the space. This frees up the deck space (real estate) on a ship for other useful purposes and also removes the cost of constructing the separate compartment.

An alternative method to the proposed dual release circuit would be to make the fire extinguishing containers with two electric/pyrotechnic actuators built inside instead of one so that two standard fire alarm releasing circuits could be used. However, this would add to the cost of the equipment and it would mean that the equipment being released would have to be re-tested by Underwriters' Laboratories at significant cost. Another alternative would be to use duplicated pneumatic circuits as per the traditional marine practice. The circuits for such an approach would be unsupervised and the level of reliability would be significantly less. Additionally, the pneumatic route may require duplicated gas sources, valves, etc. which adds significant complexity. Yet another alternative would be to run parallel circuits to each of the fire extinguishing containers. This may require much higher currents and significantly increase installation costs. A failure of one circuit would likely result in the inability to release one fire extinguishing container, and thus additional containers may be needed at additional cost to accomplish the same level reliable release all of the extinguishing agent. Further alternative approaches involve continuing to install the fire protection containers outside the space at much higher cost, installing fire protection systems offering lower performance to obtain lower cost, and installing mechanical cable pulls. These alternative approaches may limit the number of containers that can be released. Because the actuator cables can extend through long lengths of pipe or tubes, and have numerous pulleys and bends, it can be physically difficult to pull a cable with sufficient force for manual release.

Additional Notes and Examples

Example 1 can include subject matter (such as an apparatus or dual circuit) comprising a plurality of pyrotechnic initiators electrically interconnected in series, a plurality of subcircuits electrically interconnected between the pyrotechnic initiators to form at least a first circuit route to electrically interconnect the plurality of pyrotechnic initiators and a second circuit route to electrically interconnect the pyrotechnic initiators, and a control unit electrically connected to the first circuit route and the second circuit route and configured to monitor a first parameter of the first circuit route, monitor a second parameter of the second circuit route, detect when at least one of the first parameter and the second parameter is outside of a specified parameter range, and generate an alert indication according to the detection.

In Example 2, the subject matter of Example 1 can optionally include a control unit that includes a port configured to receive a release request, and wherein the control unit is configured to initiate application of a release current to at least one of the first circuit route and the second circuit route in response to the release request, wherein the release current is configured to ignite the pyrotechnic initiators.

In Example 3, the subject matter of Example 2 can optionally include a port configured to receive the release request from a fire detection unit.

In Example 4, the subject matter of one or any combination of Examples 2 and 3 can optionally include a port configured to receive the release request from a user activation interface.

In Example 5, the subject matter of one or any combination of Examples 1-4 can optionally include a control unit configured to apply a first constant monitoring current to the first circuit route, apply a second constant monitoring current to the second circuit route, and monitor a first voltage at terminals of the first circuit route as the first parameter and monitor a second voltage at terminals of the second circuit route as the second parameter.

In Example 6, the subject matter of one or any combination of Examples 1-4 can optionally include a control unit configured to apply a first constant monitoring voltage to the first circuit route, apply a second constant monitoring voltage to the second circuit route, and monitor a first current flowing through the first circuit route as the first parameter and monitor a second current flowing through the second circuit route as the second parameter.

In Example 7, the subject matter of Examples 6 can optionally include a first circuit route and a second circuit route that includes an end of line circuit that includes a resistive divider circuit.

In Example 8, the subject matter of one or any combination of Examples 1-7 can optionally include a subcircuit includes at least one diode electrically connected to a pyrotechnic initiator.

Example 9 can include subject matter (such as a system or fire protection actuation circuit) or can optionally be combined with the subject matter of one or any combination of Examples 1-13 to include subject matter, comprising a plurality of pyrotechnic initiators electrically interconnected in series, wherein a pyrotechnic initiator is included in an ignition unit of a fire extinguishing assembly, a plurality of subcircuits electrically interconnected between the pyrotechnic initiators to form a first circuit route to electrically interconnect the plurality of pyrotechnic initiators and a second circuit route to electrically interconnect the pyrotechnic initiators, and a control unit electrically connected to the first circuit route and the second circuit route. The control unit can optionally be configured to monitor a first parameter of the first circuit route, monitor a second parameter of the second circuit route, detect when at least one of the first parameter and the second parameter is outside of a specified parameter range, generate an alert indication according to the detection, and apply, in response to a release request, a release current to the pyrotechnic initiators using at least one of the first circuit route or the second circuit route.

In Example 10, the subject matter of Example 9 can optionally include a control unit configured to apply a first constant monitoring current to the first circuit route, apply a second constant monitoring current to the second circuit route, monitor a first voltage at terminals of the first circuit route as the first parameter and monitor a second voltage at terminals of the second circuit route as the second parameter.

In Example 11, the subject matter of Example 9 optionally includes a control unit configured to apply a first constant voltage to the first circuit route, apply a second constant voltage to the second circuit route, and monitor a first current flowing through the first circuit route as the first parameter and monitor a second current flowing through the second circuit route as the second parameter.

In Example 12, the subject matter of one or any combination of Examples 9-11 optionally includes release current having a current magnitude value greater than a current magnitude value of both the first constant monitoring current and the second constant monitoring current.

In Example 13, the subject matter of one or any combination of Examples 9-12 optionally includes a fire detection unit. The control unit can optionally be configured to receive the release request from the fire detection unit.

In Example 14, the subject matter of one or any combination of Examples 9-13 optionally includes a user activation interface. The control unit can optionally be configured to receive the release request from the user activation interface.

In Example 15, the subject matter of one or any combination of Examples 9-14 optionally includes control unit configured to alternately initiate the monitoring of the first parameter of the first circuit route and the monitoring of the second parameter of the second circuit route.

Example 16 can include subject matter (such as a method, a means for performing acts, or a machine readable medium including instructions that, when performed by the machine, that can cause the machine to perform acts), or can optionally be combined with the subject matter of one or any combination of Examples 1-15 to include subject matter, comprising monitoring, in a supervisory mode, a first circuit route and a second circuit route, wherein the first circuit route and the second circuit route include a plurality of sub-circuits electrically interconnected to a plurality of pyrotechnic initiators, and wherein the monitoring includes monitoring a first parameter of the first circuit route and a second parameter of the second circuit route, detecting that at least one of the first parameter or the second parameter is outside of a specified parameter range, and generating an alert indication in response to the detecting.

In Example 17, the subject matter of Example 16 can optionally include receiving a release request, and applying, in a release mode, a release current to at least one of the first circuit or the second circuit route in response to the release indication, wherein the release current is configured to ignite the plurality of pyrotechnic initiators.

In Example 18, the subject matter of one or any combination of Examples 16 and 17 optionally includes applying a first constant monitoring current to the first circuit route and applying a second constant monitoring current to the second circuit route, and wherein monitoring a first parameter of the first circuit route and a second parameter of the second circuit route includes monitoring a first voltage at terminals of the first circuit route as the first parameter and monitoring a second voltage at terminals of the second circuit route as the second parameter.

In Example 19, the subject matter of one or any combination of Examples 16 and 17 optionally includes recurrently applying, in a line check mode, a line check current to the first circuit and the second circuit route in a direction opposite of the release current, wherein a current magnitude of the line check current is insufficient to ignite the plurality of pyrotechnic initiators, and applying, in a release mode, a release current to at least one of the first circuit or the second circuit route, wherein a current magnitude of the release current is sufficient to ignite the plurality of pyrotechnic initiators.

In Example 20, the subject matter of one or any combination of Examples 16, 17 and 19 optionally includes including applying a first constant monitoring voltage to the first circuit route, applying a second constant monitoring voltage to the second circuit route, and wherein monitoring a first parameter of the first circuit route and a second parameter of the second circuit route includes monitoring a first current flowing through the first circuit route as the first parameter and monitoring a second current flowing through the second circuit route as the second parameter.

Example 21 can include, or can optionally be combined with any portion or combination of any portions of any one or more of Examples 1-20 to include, subject matter that can include means for performing any one or more of the functions of Examples 1-20, or a machine-readable medium including instructions that, when performed by a machine, cause the machine to perform any one or more of the functions of Examples 1-20.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A fire protection actuation circuit comprising:
   a plurality of pyrotechnic initiators electrically interconnected in series, wherein a pyrotechnic initiator is included in an ignition unit of a fire extinguishing assembly;
   a plurality of subcircuits electrically interconnected between the pyrotechnic initiators to form a first circuit route to electrically interconnect the plurality of pyrotechnic initiators and a second circuit route to electrically interconnect the pyrotechnic initiators; and
   a control unit electrically connected to the first circuit route and the second circuit route and configured to:
   apply a first constant monitoring current to the first circuit route;
   apply a second constant monitoring current to the second circuit route;
   monitor a first voltage at terminals of the first circuit route as a first parameter of the first circuit route;
   monitor a second voltage at terminals of the second circuit route as a second parameter of the second circuit route;
   detect when at least one of the first parameter and the second parameter is outside of a specified parameter range;
   generate an alert indication according to the detection; and
   apply, in response to a release request, a release current to the pyrotechnic initiators using at least one of the first circuit route or the second circuit route, wherein the applied release current is configured to ignite a plurality of pyrotechnic initiators of the at least one of the first circuit route or the second circuit route.

2. The fire protection actuation circuit of claim 1, wherein the control unit is configured to apply a first constant voltage to the first circuit route, apply a second constant voltage to the second circuit route, and monitor a first current flowing through the first circuit route as the first parameter and monitor a second current flowing through the second circuit route as the second parameter.

3. The fire protection actuation circuit of claim 1, wherein the release current has a current magnitude value greater than a current magnitude value of both the first constant monitoring current and the second constant monitoring current.

4. The fire protection actuation circuit of claim 1, including a fire detection unit, wherein the control unit is configured to receive the release request from the fire detection unit.

5. The fire protection actuation circuit of claim 1, including a user activation interface, wherein the control unit is configured to receive the release request from the user activation interface.

6. The fire protection actuation circuit of claim 1, wherein the control unit is configured to alternately initiate the monitoring of the first parameter of the first circuit route and the monitoring of the second parameter of the second circuit route.

7. A method comprising:
   monitoring, in a supervisory mode, a first circuit route and a second circuit route, wherein the first circuit route and the second circuit route include a plurality of sub-circuits electrically interconnected to a plurality of pyrotechnic initiators, and wherein the monitoring includes:
   applying a first constant monitoring voltage to the first circuit route and applying a second constant monitoring voltage to the second circuit route;
   monitoring a first current flowing through the first circuit route as a first parameter of the first circuit route and a second current flowing through the second circuit route as a second parameter of the second circuit route;
   detecting that at least one of the first parameter or the second parameter is outside of a specified parameter range;
   generating an alert indication in response to the detecting; and
   applying, in a release mode, a release current to at least one of the first circuit or the second circuit route, wherein the release current is configured to ignite the plurality of pyrotechnic initiators.

8. The method of claim 7, including:
   receiving a release request; and
   applying the release current in response to the release request.

9. The method of claim 7, including applying a first constant monitoring current to the first circuit route and applying a second constant monitoring current to the second circuit route, and wherein monitoring a first parameter of the first circuit route and a second parameter of the second circuit route includes monitoring a first voltage at terminals of the first circuit route as the first parameter and monitoring a second voltage at terminals of the second circuit route as the second parameter.

10. The method of claim 8, including:
    recurrently applying, in a line check mode, a line check current to the first circuit and the second circuit route in a direction opposite of the release current, wherein a current magnitude of the line check current is insufficient to ignite the plurality of pyrotechnic initiators; and
    applying, in a release mode, a release current to at least one of the first circuit or the second circuit route, wherein a current magnitude of the release current is sufficient to ignite the plurality of pyrotechnic initiators.

* * * * *